May 18, 1965
M. D. McCORMICK
3,184,164
ROTARY VANE THERMOSTAT
Filed Sept. 13, 1963
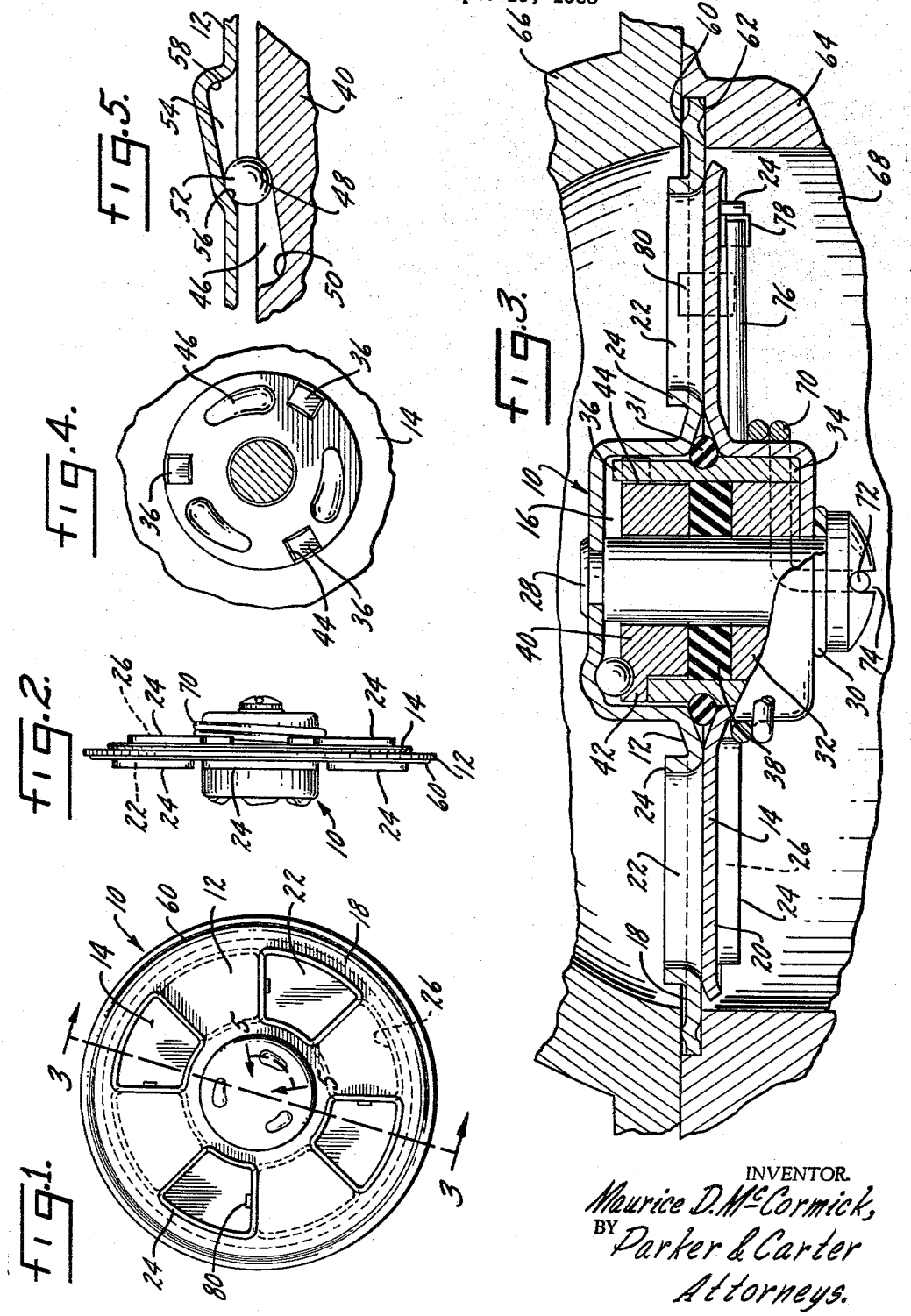
INVENTOR.
Maurice D. McCormick,
BY Parker & Carter
Attorneys.

3,184,164
ROTARY VANE THERMOSTAT
Maurice D. McCormick, 308 Maple,
Prospect Heights, Ill.
Filed Sept. 13, 1963, Ser. No. 308,905
14 Claims. (Cl. 236—34)

This invention relates to a temperature responsive rotary thermostat and in particular to a thermostat of the type described utilizing a solid expandable temperature responsive means for opening the thermostat.

One purpose is a thermostat of the type described utilizing the expansion of a temperature responsive mass to produce rotary motion between the elements of the thermostat.

Another purpose is a rotary thermostat of the type described which is rugged in construction and can be manufactured at relatively low cost.

Another purpose is a temperature responsive rotary thermostat of the type described which is a completely sealed unit and which provides minimum turbulence to the passage of fluid.

Another purpose is a thermostat of the type described which has a wiping seal action as the elements of the thermostat rotate relative to each other.

Another purpose is a rotary thermostat of the type described which can be installed without alignment and is easily calibrated.

Another purpose is a rotary thermostat of the type described in which the degree of alignment of the openings in the thermostat is directly related to the temperature of the water flowing through the thermostat.

Another purpose is a rotary thermostat of the type described having increased flow capacity.

Another purpose is a reliably operable thermostat of the type described.

Other purposes will appear in the ensuing specification, drawings and claims.

The invention is illustrated diagrammatically in the following drawings wherein:

FIGURE 1 is a top plan view of a thermostat of the type described,

FIGURE 2 is a side view of the thermostat illustrated in FIGURE 1,

FIGURE 3 is an enlarged section along plane 3—3 of FIGURE 1,

FIGURE 4 is a top plan view of a ring member used to provide a rotary motion, and FIGURE 5 is an enlarged section along plane 5—5 of FIGURE 1.

The thermostat of this invention has utility in vehicle water systems and may include a housing indicated generally at 10 and including a pair of relatively rotatable cover members 12 and 14. The cover members 12 and 14 have generally central sections which define a chamber 16 and generally outwardly directed annular surfaces 18 and 20 respectively. The surface 18 may have a plurality, in this case four, openings 22 defined by generally upstruck rims or lips 24. Openings 26 may be formed in a like manner in the cover member 14. There is the same number of openings in the cover members 12 and 14 and the openings are generally the same in size and shape. Normally the openings will be maintained out of alignment, as in FIGURE 1, with the cover members moving relative to each other to provide a gradually increasing degree of alignment between the openings as the temperature of the water increases. The cover members 12 and 14 may be held together by a suitable rivet or the like 28, there being a seal 30 between the head of the rivet and the cover member 14. An annular seal ring 31 may be positioned within the chamber 16 and between the cover members.

Positioned within the chamber 16 is a temperature responsive expandable and contractable mass 32 which may surround the central shaft of the rivet 28. The make-up of the mass 32 may vary considerably and a combination of intimately mixed copper and wax has been found to be satisfactory. Regardless of the make-up of the mass, what is important is that it be expandable in response to an increase in temperature and the degree or amount of expansion be related to the increase in temperature.

Surrounding the element 32 and preferably in a press fit or otherwise fixed to the cover member 14 is a cylinder 34. As illustrated in FIGURE 3, the cylinder 34 extends upwardly into the cover member 12 and may have a plurality of spaced projections 36 at its upper end or the end within the cover member 12. A suitable seal or cushion member 38 may be positioned on top of the element 32 to support a ring member 40. The ring 40 is within the cylinder 34 and may have an outstanding peripheral flange 42 which seats on top of cylinder 34, with the flange 42 having grooves or the like 44 to receive the projections 36 such that rotation of the ring will cause rotation of the cylinder.

Positioned in the upper surface of the ring 40 are a plurality, in this case three, grooves or races 46 as illustrated in FIGURE 5, which gradually deepen from the shallow end 48 to the deep end 50. A ball 52 is positioned in each groove. Mating grooves or races 54 are formed in the cover member 12 with the grooves 54 becoming gradually deeper from the shallow end 56 to the deep end 58.

In operation, axially directed pressure from the ring 40, caused by expansion of the mass 32, will cause the balls 52 to move in an arc in the grooves. As the balls move they will cause relative rotation between the two cover members. Because cover member 12 is fixed to the engine assembly, the lower cover member 14 will move relative to the cover member 12. This rotational movement between the two cover members will move the opening 26 or the fluid passages 26 toward alignment with the fluid passages or openings 22. The degree of alignment or the amount of movement will be determined by the expansion of the mass 32 with the expansion of this mass being determined by the temperature to which the thermostat is subjected.

The cover member 12 may have an upwardly extending embossed rib 60 which extends into a groove or the like 62 formed in the motor block indicated generally at 64. An outlet casting 66 seats on the rib 60 with the combination of the outlet casting and the motor block holding the thermostat in position in the passage 68. As is conventional in vehicle thermostats, the temperature of the water in the motor will determine the amount of water that is directed from the radiator through the vehicle water system. As the temperature in the engine increases, more water from the radiator is permitted to flow through the system. The amount of water flowing through the thermostat is determined by the degree to which the openings 22 and 26 are in alignment. The openings 22 and 26 are normally maintained out of alignment by a spring or the like 70 which has an end 72 positioned in a slot 74 in the head of the rivet 28. The spring 70 is wound around cover member 14 and has an end portion 76 which is in contact with a small ear or tab 78 formed on the cover member 14. The rivet 28 may be fixed to the cover member 12 and urges the cover member 14 in a direction to close the openings 22 and 26. A plurality of stop tabs or the like 80 extend down from cover member 12 to prevent the spring 70 from moving lower cover member 14 too far when closing. Also the tabs prevent excessive movement when the thermostat is opened.

The use, operation and function of the invention are as follows:

The rotary vane thermostat shown will normally be held in a closed position at an appropriate point near the water pump in a vehicle engine water system. As the temperature of the water within the engine increases to a point where it is necessary to circulate water through the system from the radiator, the mass 32 will expand to a degree consistent with the increase in temperature. Expansion of the mass 32 will be translated into axial movement of ring 40 with this axial movement being translated into relative rotational movement between the cover members 12 and 14. When the cover members are in the full open position and the openings 22 and 26 are in complete register, the mass 32 will have expanded the maximum amount possible.

The element 32 may be made of any suitable material or combination of materials which is satisfactory to expand in direct relation to the increase in temperature applied to the materials. Intimately mixed copper and wax is a satisfactory combination of materials.

Of particular importance in the invention is the fact that as the cover members rotate relative to each other there is a wiping seal action between the outer peripheral surfaces of the cover members at the points of contact therebetween. In addition to this sealing action there is an internal seal positioned within the chamber. Both sealing areas maintain the chamber water-tight. The unit is completely sealed. A suitable lubricant may be placed within the sealed unit.

Calibration of the unit is easily accomplished. The make-up of the element 32 determines the degree of movement between the cover members and hence the amount of water that will pass through the thermostat for a given temperature.

The unit is small, compact and rugged. The aligned openings in the cover members hold water turbulence to a minimum.

As shown, it is only necessary to have an eighth of a turn in order to have complete registry between the openings in the two cover members. This is not essential to the invention and the amount of rotation necessary to affect complete registry will depend upon the number of openings, their position and size.

The sealed chamber in the center of the thermostat provides power for movement. The entire outer flanges or vanes may be utilized for water openings to provide increased flow capacity over previous types of thermostats. By having water flow at right angles to the vanes, there is no tendency for oscillation or chatter. Also the pressure of the water increases the sealing action. Variations in flow pressure have no effect on vane action.

Whereas the preferred form of the invention has been shown and described herein, it should be realized that there are many modifications, substitutions and alterations thereto within the scope of the following claims.

I claim:

1. In a temperature responsive rotary thermostatic valve, a housing including a pair of opposed relatively rotatable cover members, means connecting said cover members together to prevent relative axial movement thereof, said means being fixed to one cover member and pivotally movable relative to the other cover member to permit relative rotation between said two cover members, each cover member having an outwardly directed annular surface, said surfaces being in contact with each other and each having a plurality of fluid openings, spring means fixed to one of said cover members and urging the other cover member in a direction to maintain said openings out of alignment with each other, a temperature responsive expandable mass within said housing, means responsive to expansion of said mass for causing relative rotation of said cover members to move said openings toward alignment, the expansion of said mass determining the amount of relative movement and the degree of alignment of said openings.

2. The structure of claim 1 further characterized by and including means confining said temperature responsive mass in all but one direction.

3. The structure of claim 2 further characterized in that the means responsive to expansion of said mass for causing relative rotation of said cover members includes means for translating linear movement into rotational movement.

4. The structure of claim 3 further characterized in that the means for translating linear motion into rotational movement includes a plurality of races in one of said cover members, and a plurality of balls positioned to move in said races.

5. The structure of claim 2 further characterized in that the means for confining said temperature responsive mass includes a cylinder positioned within said cover members.

6. The structure of claim 1 further characterized in that said temperature responsive mass includes copper and wax.

7. The structure of claim 1 further characterized by and including a seal between said cover members.

8. The structure of claim 1 further characterized in that the means responsive to expansion of said mass for causing relative rotation between said cover members includes a ball and race arrangement effective to translate linear movement into rotational movement.

9. In a temperature responsive rotary thermostatic valve, a housing including a pair of opposed relatively rotatable cover members defining a chamber and each having an outwardly directed annular surface, said surfaces each having a plurality of fluid openings and each being in contact with each other, means connecting said cover members together to prevent relative axial movement thereof, said means being fixed to one cover member and pivotally movable relative to the other cover member to permit relative rotation between said two cover members, yielding means normally biasing said cover members so that said openings are out of alignment with each other, a temperature responsive expandable mass within said chamber, a cylinder within said chamber confining expansion of said mass to an axial direction, said cylinder being fixed to one of said cover members, a ring fixed to said cylinder and having a plurality of gradually deepening grooves, a ball positioned in each groove, a plurality of gradually deepening grooves on said other cover member, said balls being positioned in the grooves on said other cover member, axial expansion of said mass causing axial movement of said ring, axial movement of said ring being translated through said balls and grooves into relative rotation of said cover members to move said openings toward alignment.

10. The structure of claim 9 further characterized in that there are the same number of openings in each of said cover members, said openings being generally the same in size and shape.

11. The structure of claim 9 further characterized by a flange on said ring overlying said cylinder, a plurality of openings in said flange, and a plurality of projections on said cylinder extending upwardly into said openings.

12. The structure of claim 9 further characterized by and including a seal member positioned within said chamber and within said cylinder between said ring and expandable mass.

13. The structure of claim 9 further characterized in that said yielding means includes a coiled spring fixed to one of said cover members and urging the other cover member in a direction to maintain said openings out of alignment.

14. The structure of claim 13 further characterized by and including at least one tab on one side of said cover members, said tab being effective to limit movement of the other cover member.

References Cited by the Examiner
UNITED STATES PATENTS

| | | | |
|---|---|---|---|
| 1,711,901 | 5/29 | Nelson | 236—34 |
| 2,177,980 | 10/39 | Gaul | 236—34.5 |
| 2,539,090 | 1/51 | Leland | 74—99 |
| 2,894,689 | 7/59 | Spicer et al. | 236—34.5 |
| 2,960,270 | 11/60 | Long | 236—34 |

EDWARD J. MICHAEL, *Primary Examiner.*